(No Model.) 4 Sheets—Sheet 1.
J. F. PACKER & W. H. GAEDE.
APPARATUS FOR HEATING BUILDINGS.

No. 419,969. Patented Jan. 21, 1890.

(No Model.) 4 Sheets—Sheet 3.
J. F. PACKER & W. H. GAEDE.
APPARATUS FOR HEATING BUILDINGS.

No. 419,969. Patented Jan. 21, 1890.

Witnesses
G. H. Francis
Harry T. Jones

Inventors.
John F. Packer
William H. Gaede

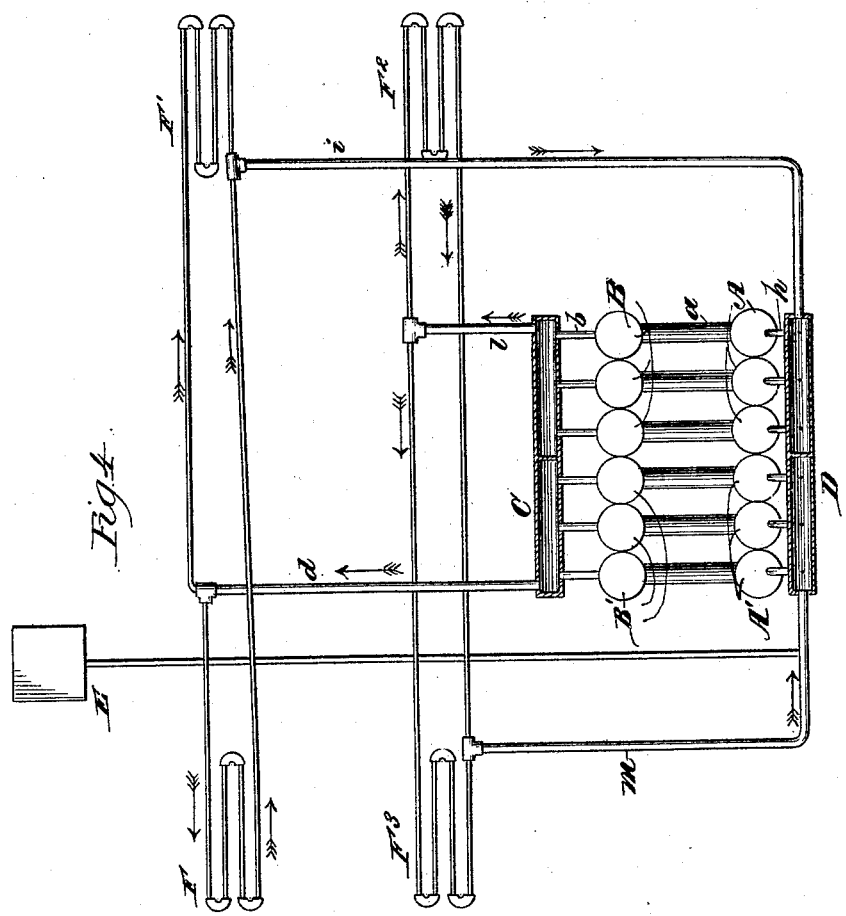

UNITED STATES PATENT OFFICE.

JOHN F. PACKER AND WILLIAM H. GAEDE, OF CHICAGO, ILLINOIS; SAID GAEDE ASSIGNOR TO J. HARLEY BRADLEY, OF SAME PLACE.

APPARATUS FOR HEATING BUILDINGS.

SPECIFICATION forming part of Letters Patent No. 419,969, dated January 21, 1890.

Application filed August 25, 1888. Serial No. 283,723. (No model.)

*To all whom it may concern:*

Be it known that we, JOHN F. PACKER and WILLIAM H. GAEDE, residing at Chicago, in the county of Cook and State of Illinois, and citizens of the United States, have invented a new and useful and Improved Apparatus for Heating Buildings, of which the following is a specification, reference being had to the accompanying drawings, in which—

Figure 1:
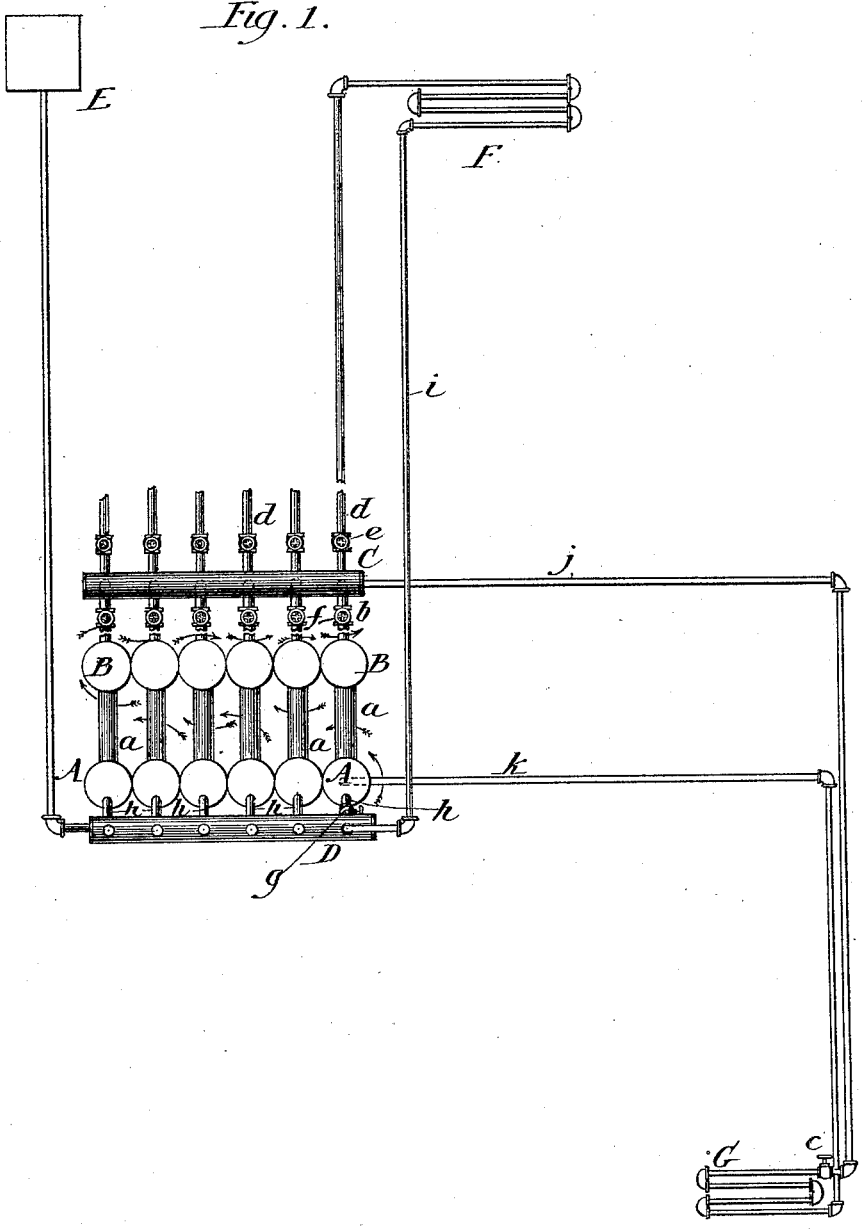
Figure 2:
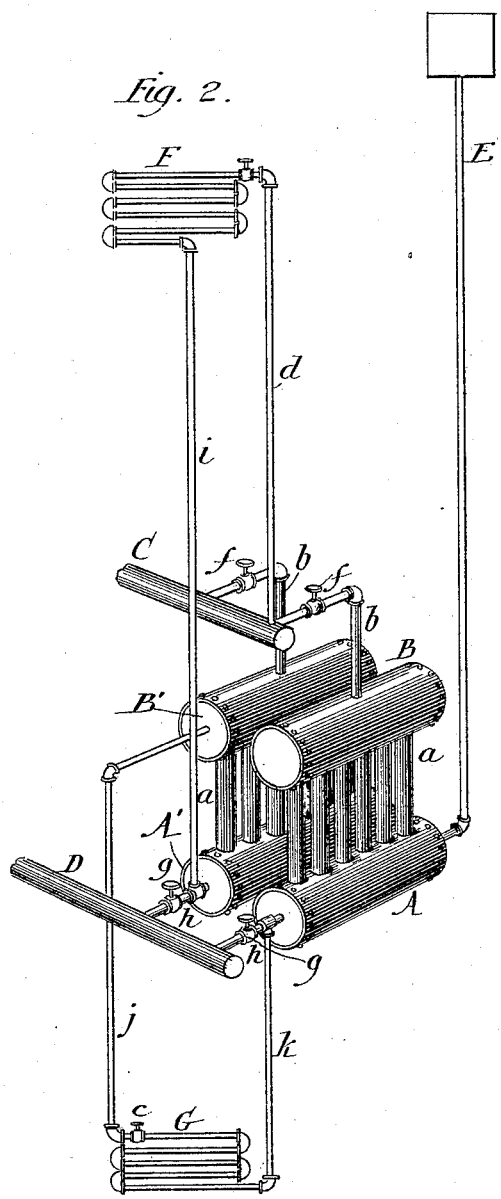
Figure 3:
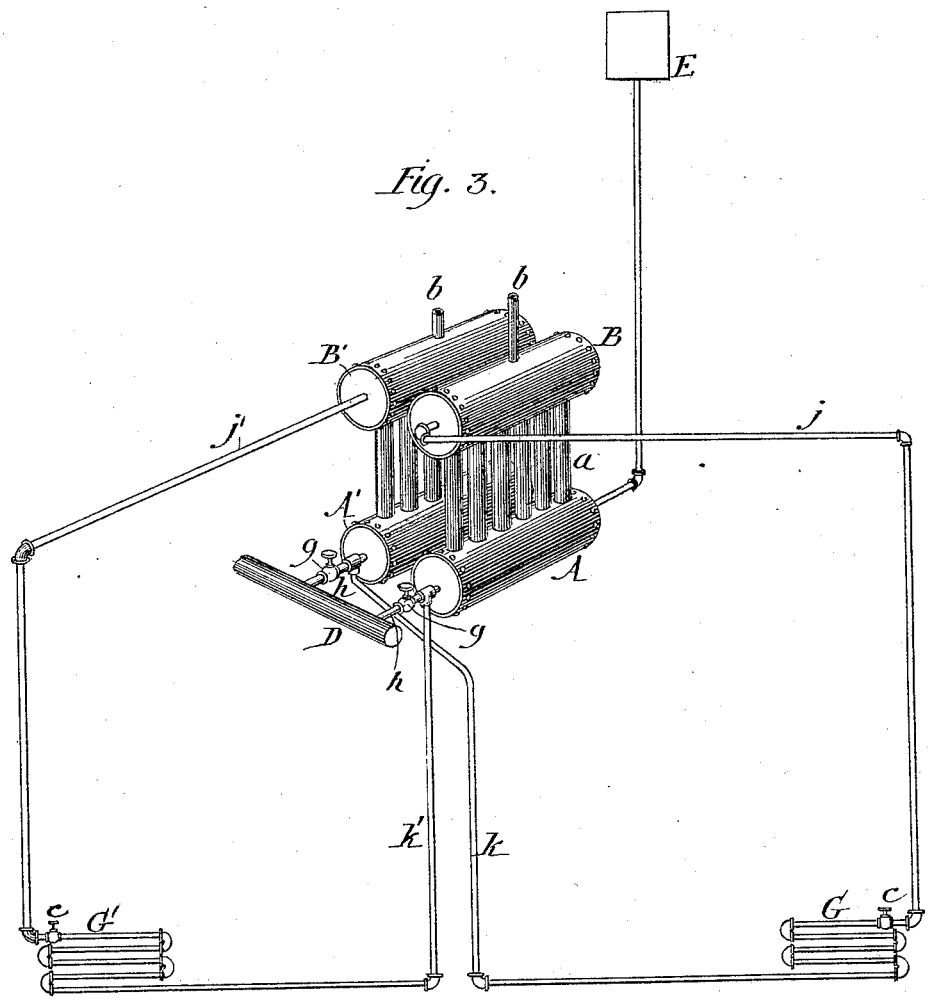

Figure 1 is an end elevation of a heating apparatus embodying our invention, showing radiators above and below the heater. Fig. 2 is a perspective view of our heating apparatus, showing one radiator above and one below the heater. Fig. 3 is a perspective view of our heating apparatus, showing radiators below the heater only. Fig. 4 is a partly sectional elevation of our heating apparatus, showing radiators above the heater only.

Heretofore it has been considered impracticable, if not impossible, to maintain a circulation of hot water for heating purposes in or through radiators located below the heater, and very difficult to maintain a continuous circulation through radiators located on a level with the heater. It has also been difficult heretofore to obtain an equalized circulation through the radiators located at unequal distances from the heater.

In our apparatus the heater may be located on any floor of an ordinary building and the hot water circulated for heating purposes below as well as above the heater, and also at unequal distances therefrom, as illustrated in the annexed drawings and hereinafter described.

That which we claim as new will be pointed out in the claims.

In the drawings, the reference-letters A and A' indicate the lower boilers, and B B' indicate the upper boilers, of a battery of boilers or heaters, each boiler A or A' being located directly beneath a corresponding upper boiler B or B'.

C is the distributing-head arranged above the upper boilers, and D is the receiving-head arranged upon a level, or substantially so, with the lower boilers.

E is an expansion reservoir and pipe leading thereto from the receiving-head D or from one of the lower boilers.

F, F', F$^2$, and F$^3$ are radiators located above the heater or boilers.

G G' are radiators located below the heater or boilers.

$a$ $a$ are vertical tubes connecting the lower and upper boilers of each section of the battery of boilers or heaters.

$b$ $b$ are valved pipes connecting the upper boilers B B' with the distributing-head C.

$d$ $d$ are valved supply-pipes leading from the distributing-head to upper radiators F F'.

$c, e, f,$ and $g$ are valves.

$h$ $h$ are valved pipes leading from the receiving-head D to the lower boilers A A'.

$i$ $i$ are return-pipes leading from the upper radiators.

$j$ $j'$ are valved supply-pipes leading from the heater to the lower radiators G G', respectively.

$k$ $k'$ are return-pipes leading from the radiators G G', respectively, and communicating with the boilers or heaters.

I is a supply-pipe, and $m$ a return-pipe connecting the receiving-head and distributing-head of a battery of boilers with radiators F$^2$ and F$^3$ located between the uppermost radiators F F' and the heater, as shown in Fig. 4.

The apparatus shown and herein described is in some respects similar to that shown and described in our former application, Serial No. 265,190, filed February 24, 1888, several forms for carrying the invention into practical use being shown, including a suitable apparatus for obtaining a combined upper and lower circulation of hot water from a single heater.

Our invention is best carried into practical effect by the use of the peculiar construction of boilers shown in our said former application; but different forms of heaters may be used.

It will be understood that the radiators may be of any well-known form or construction for hot-water heating, and as many of them may be used as may be necessary for properly heating the building.

For a large building, a heater or battery of boilers comprising more than two boiler-sections, as shown in Figs. 1 and 4, would be preferable, while for smaller buildings a heater in two sections, as shown in Figs. 2 and 3, will be sufficient. Those shown in these figures may be used as a part of a large battery of boilers.

The circulation of hot water for heating purposes is understood to be as follows: Heat expands water, thereby lowering its specific gravity, so that the heated water will be forced to rise by the flowing in of the colder water from the same or a higher level, because its specific gravity is greater than that of the heated water. When a proper apparatus is used, a circulation of heated and colder water will be established by the colder and heavier water flowing into the heater and forcing the heated water to rise.

It has not been found difficult to establish a circulation of heated water through radiators located above the heater, at substantially the same elevation, because the greater specific gravity of the water in the return-pipe, which radiated its heat, will force the heated water to rise from the heater; but this difference in specific gravity of heated and colder water has made it difficult to establish and maintain a circulation of heated water below the heater. By our invention a forced circulation of hot water is obtained through radiators lower than the heater and an equalized circulation at unequal distances therefrom.

In Fig. 1 is shown an apparatus in which a circulation through radiators located above the heater is obtained in connection with a forced circulation through radiators located below the heater. In this form of apparatus the supply-pipes $d$ for the upper radiators F are connected with the distributing-head C, and the return-pipe $i$ from the radiator F is connected with the receiving-head D, so that the circulation through any of the radiators does not depend on any single section of the battery of boilers, and any section of the battery of boilers may be cut out without interfering with the circulation through the radiators F. The circulation through the radiator G, Fig. 1, which is located below the heater, is as follows: The supply-pipe $j$ is connected with the distributing-head C, and is led outward and downward as far as may be necessary to properly locate the radiator G, and the return-pipe $k$ from the radiator G is connected with one of the lower boilers A. The valve $g$, Fig. 2, in the pipe $h$, which connects the receiving-head D with the boiler A, to which the pipe $k$ is connected, is closed. As the water in the boiler A is heated it rises and passes upward through the tubes $a$ into the boiler B, and from thence through the pipe $b$ into the distributing-head C, thereby tending to produce a vacuum in the boiler A; but as the return-pipe $k$ from the radiator G is the only source of supply to the boiler A the water from the radiator G will rise, causing the heated water to descend from the distributing-head C to the radiator. The circulation thus established causes a circulation of heated water downward to a radiator below the heater and of colder water upward from the radiator to the heater. All that is required to start the circulation is to close the valve $g$, making the return-pipe $k$ the only source of supply to the boiler.

In the apparatus shown in Fig. 2 there are two sections in the battery of boilers or two heaters A B and A' B', and one radiator above and one below the boilers or heaters. The supply-pipe $d$ from the first section of the battery of boilers or heaters A B leads to the upper radiator F, and the return-pipe $i$ from the upper radiator F leads to the lower boiler A' of the second section of the battery of boilers or heater, while the supply-pipe $j$ for the lower radiator G leads from the upper boiler of the second section of the battery of boilers or heater, and the return-pipe $k$ from the lower radiator G leads to the lower boiler A of the first section or heater. The valves $g$ in the pipes $h$ are closed, and the valve $f$ in the pipe leading from the boiler B' to the distributing-head C is closed, making the supply-pipe $j$ the only way of escape from the second section of the battery of boilers or heater. The water in the boiler A of the first section as it is heated rises through the vertical tubes $a$ into the boiler B, and through the pipe $b$ into the distributing-head C, and thence upward through the pipe $d$ to the radiator F. The water in the radiator F is cooled and returns through the pipe $i$ to the lower boiler A' of the second section of the heater, where it is reheated and forced by the cool water in the pipe $i$ to pass up into the boiler B' and out through the pipe $j$ and down through the radiator G below the heater. As the supply-pipe $j$ is the only way of escape from the second section of boilers or heater, and the return-pipe $k$ is the only source of supply to the first section or heater A, the water will rise through the pipe $k$ to the boiler A, completing a circulation. More than two sections of boilers may be used, as well as different forms of boilers, the form of apparatus shown in Figs. 1, 2, and 3 being designed to illustrate a practical means for causing a circulation below the heater.

In the apparatus shown in Fig. 3 the radiators are all located below the heater. This figure also illustrates how a uniform circulation is maintained through two or more radiators located at different distances from the boilers or heater from which they are supplied. The usual receiving-head D is shown;

also the pipes $b$ for connecting a distributing-head. (Not shown, but which would be used in case more boiler-sections were used and a circulation established on floors above the boilers.)

In order to maintain a uniform circulation through two or more radiators, it is necessary to have an independent heating apparatus for each radiator and to connect them, for the reason that it is not practicable to locate the various radiators at equal distances from the heater or under equal conditions, so that the circulation can be maintained to one as readily as to the others. The manner of obtaining a circulation of this kind is as follows: The boilers and pipes are filled with water in the usual manner and the valves $g$ are closed. The water as it is heated rises in the boiler A through the small and non-circulating tubes $a$ to the boiler B, thence through the tube or pipe $j$ to the radiator G, and returns through the return-pipe $k$ to the boiler A′, where it is reheated, and passes up through the tubes $a$ to the boiler B′, and then passes through the pipe $j'$ to the radiator G′, and returns through the pipe $k'$ to the boiler A, thereby connecting the two boiler-sections through the service-pipes only of the different radiators. In this form we do not depend on the difference in the specific gravity of the hot and cold water to maintain a circulation, but upon our peculiar manner of making the radiator supply-pipes the only way of escape from the boiler. By thus crossing the service-pipes a substantially equalized circulation is obtained for the radiators at unequal distances from the heater, because the water must flow through the entire connected system with equal speed. Water that may be needed to supply any wastage or loss may be supplied through any suitable pipe having a connection that may be closed.

In Fig. 4 we have shown a hot-water heating apparatus arranged for obtaining an equalized circulation in a number of radiators located on different floors of a building above the heater and at unequal distances therefrom. The distributing-head C and the receiving-head D, as shown, are each divided into a number of sections equal to the number of floors to be heated. These separate sections of the distributing-head C and receiving-head D communicate with the boiler-sections A B and A′ B′, respectively. In this form of apparatus the radiators F and F′, located on the same upper floor, are both supplied with hot water through a single pipe $d$, having branches leading to said radiators. This pipe $d$ leads from that section of the distributing-head C which communicates with the boiler section or sections A′ B′. The cool water from the radiators F and F′ is delivered to a single return-pipe $i$, that discharges into that section of the receiving-head D which communicates with the boiler section or sections A B. On another floor of the building may be located radiators $F^2$ $F^3$, supplied with hot water through a pipe $l$, leading from that section of the distributing-head C which communicates with the boiler section or sections A B, and these radiators deliver their cool water to a return-pipe $m$, discharging into that section of the receiving-head D which communicates with the boiler section or sections A′ B′. The separate sections of the distributing-head may each communicate with one or more separate boiler-sections, as preferred. It will be understood that the distributing-head C may, when desired, be divided into sections by valves, as shown in our said former application.

What we claim as our invention is—

1. In a hot-water heating apparatus, the combination of an upper radiator having supply and return pipes, with a lower radiator having supply and return pipes, and an intermediate heater composed of two or more independently-operating sections with which the supply and return pipes of the said radiators are cross-connected, each radiator having its supply-pipe leading from the upper part of a heater-section and its return-pipe leading to the lower part of a different section, whereby the water of the upper radiator is utilized in maintaining a lower circulation and equalizing both, substantially as described.

2. In a hot-water heating apparatus, the combination of an upper radiator having supply and return pipes cross-connected with different sections of an intermediate heater composed of two or more independently-operating sections, and a lower radiator having supply and return pipes similarly cross-connected with said heater-sections, each radiator having its supply-pipe leading from the upper part of one heater-section and its return-pipe leading to the lower part of the other section, whereby the water is reheated in circulating from a radiator at one elevation to a radiator of a lower elevation, substantially as described.

3. In a hot-water heating apparatus having its heater composed of two or more independently-working sections, the combination of a radiator having its supply-pipe connected with the upper part of one section of the heater and its return-pipe connected with the lower part of another section of the heater, with another radiator having its supply and return pipes similarly cross-connected with the heater-sections, whereby a uniform circulation of water is maintained in radiators unequally located in respect to an intermediate heater, substantially as described.

4. The heater formed in two or more independently-operating sections A B and A′ B′, in combination with a radiator F, having its supply-pipe leading from the upper part B of one section and its return-pipe leading to the lower part A' of the other section, and the lower radiator having its supply-pipe leading from the upper part B' of one section and its return-pipe leading to the lower part A of the other section, whereby the circulation between the heater-sections and the complete circulation of the water is made through the radiators and their connecting-pipes, substantially as described.

JOHN F. PACKER.
WILLIAM H. GAEDE.

Witnesses:
G. H. FRANCIS,
HARRY T. JONES.